United States Patent [19]
Blatter et al.

[11] 3,862,675
[45] Jan. 28, 1975

[54] FLUID INJECTION ANTISKID BRAKE SYSTEM

[75] Inventors: Albert Blatter, Southfield, Mich.;
John T. Kasselmann; George B. Hickner, both of South Bend, Ind.

[73] Assignee: The Bendix Corporation, Southfield, Mich.

[22] Filed: Aug. 15, 1973

[21] Appl. No.: 388,522

[52] U.S. Cl. .............................. 188/181 R, 188/2 R
[51] Int. Cl. ............................................... B60t 8/08
[58] Field of Search ............ 188/1 R, 2 R, 2 A, 180, 188/181 R, 181 A, 181 T, 264 E; 303/1, 21 R, 21 F, 21 A

[56] References Cited
UNITED STATES PATENTS

| | | | |
|---|---|---|---|
| 1,707,987 | 4/1929 | Likas | 188/2 R |
| 2,409,099 | 10/1946 | Bloomfield | 188/264 E |
| 3,044,736 | 7/1962 | Chambers | 188/264 E |
| 3,777,858 | 12/1973 | Murphy | 188/181 R |

*Primary Examiner*—Duane A. Reger
*Attorney, Agent, or Firm*—James R. Ignatowski; John R. Benefial

[57] ABSTRACT

An antiskid brake system for a vehicle having road engaging wheels is disclosed wherein a fluid is injected between the frictionally engaging brake surfaces to reduce the energy absorbing capacity of the brake when the wheel is sensed to be skidding or in imminent danger of skidding. The injected fluid forms a thin film between the engaged surfaces reducing the friction therebetween. Normal braking capacity is restored to the wheel when the fluid injection is terminated.

30 Claims, 6 Drawing Figures

PATENTED JAN 28 1975 3,862,675

FLUID INJECTION ANTISKID BRAKE SYSTEM

BACKGROUND OF THE INVENTION

This disclosure is related to the field of antiskid devices for automotive vehicles, and in particular a system for reducing the amount of friction between a member attached to the rotating wheel and the nonrotating brake pad in response to control logic indicating that a particular wheel or set of wheels are skidding or approaching a skid condition. The antiskid devices of the prior art control the friction between the rotating and nonrotating members of the brake by adjusting the brake fluid pressure to prevent the wheels from locking or decelerating faster than a predetermined rate. These systems require complex hydraulic components to manipulate the fluid in and out of the wheel brake cylinders to control the pressure exerted between the brake elements. The metering of the brake fluid in and out of the brake cylinders must be accomplished with precision and in a manner that does not cause the brake pedal to fall. The hydraulic components usually constitute a major portion of the cost of antiskid systems.

The disclosed antiskid system overcomes many of the objections to the prior art systems by introducing a fluid between the frictionally engaged surfaces rather than controlling the brake pressure between these elements as done in the previous system. The disclosed antiskid system operates directly on the power absorption surface in the brake and is adaptable to many types of braking systems.

The principle of operation is the formation of a fluid bearing such as the air bearings used to minimize friction in precision gyroscopes or the air bearing used in ground effects vehicles to provide a frictionless air cushion between the vehicle and the underlying surface.

The inventive system introduces a fluid between the moving member and the stationary member of the brake to reduce the power absorption of the engaged surfaces. The introduced fluid is distributed across the braking surfaces by the movement of the rotating member and forms a thin lubricating layer which substantially reduces the friction between the brake pad and the mating surface. This effect is combined with the dynamic wedge effect commonly observed in journaled bearings and causes the brake paid to rise slightly, further reducing the contact area of the frictionally engaged surfaces. Upon termination of the fluid injection, the lubricating layer is rapidly dissipated and normal braking capacity is restored to the wheel.

SUMMARY OF THE INVENTION

This and other objects which will become apparent upon a reading of the following specification and claims are accomplished by providing an antiskid system wherein a fluid is injected between the rotating and non-rotating parts to control the power absorbing friction generated therebetween. In the preferred embodiment of the invention, compressed air is injected between the brake pad and the rotating brake surface in response to a logic control system indicating that the wheel being controlled is decelerating at a rate which is greater than a maximum allowable deceleration rate, at a rate faster than the rate at which the other wheels on the vehicle are being slowed down, or that the particular wheel has stopped rotating while the other wheels of the vehicle are still rotating. The control logic receives its information from individual wheel sensors, and compares the rotational speed of the vehicle's wheels with predetermined values. When the control logic senses that one or more of the wheels is in a skid condition or that a skid condition is imminent, the computer generates a signal indicative of the wheel skidding or about to skid. A valve located between a presurized fluid source and the brake opens and allows fluid to be injected between the brake pad and the rotating member. The injected fluid reduces the friction between the brake pad and the rotating member inhibiting the braking action on the particular wheel. When the wheel regains a rotating state within the predetermined parameters of the control logic, the fluid injection is terminated and normal braking force is restored to the wheel. One objective of the invention is to provide a fluid activated antiskid system operating directly on the friction between the energy absorbing brake members. Another objective of the invention is to provide an antiskid system independent of the pressure applied to the vehicle's brakes. The further objective of the invention is to reduce the power absorption between the braking surface and the rotating member by injection of a fluid therebetween. A final objective of the hydrostatic antiskid system is to provide a braking system wherein the braking force applied to the wheel by hydraulic components are not metered to adjust for variations in the rotational speed of the wheels and prevent the wheel from locking.

DETAILED DESCRIPTION OF THE DRAWINGS

Figure 1:
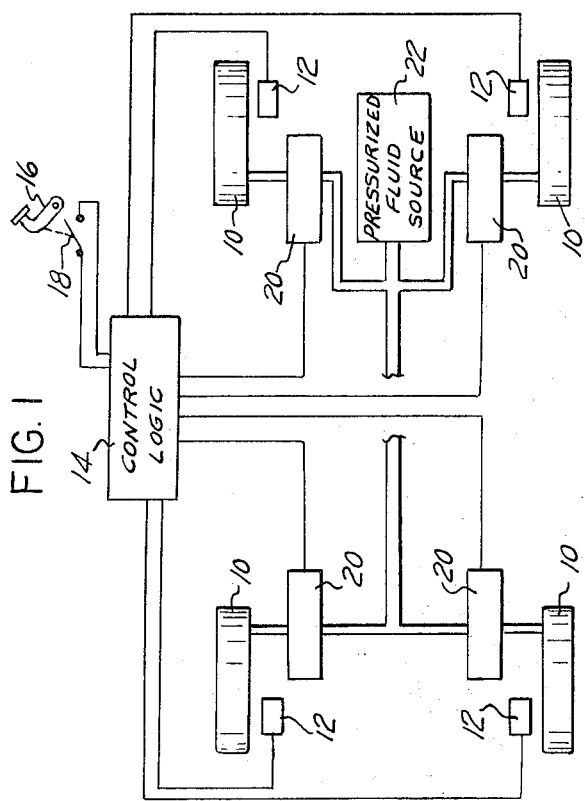
FIG. 1 is a schematic showing the antiskid system applied to a four-wheeled system.

FIG. 1 is a block diagram of the antiskid system applied to a vehicle having four wheels 10 arranged in a conventional manner as shown. For illustrative purposes, it is assumed the vehicle is equipped with a presurized, hydraulic or pneumatic brake system (not shown) capable of frictionally absorbing the inertial energy of the moving vehicle thereby decelerating the vehicle at a rate determined by the operator. The braking system may be of the conventional drum, disc type or any other type utilizing the friction between a rotating and a nonrotating surface as the means for absorbing the kinetic energy of the rotating wheels.

The antiskid system comprises a set of wheel sensors 12 detecting the rotating speed of at least each wheel to which braking forces are applied by the brake system. It is recognized that in some brake systems the braking force is not applied to all of the vehicle's wheels, however, sensors may monitor the rotational speed of the unbraked wheels to provide a reference signal indicative of the rate at which the braked wheels should be rotating in an antiskid mode. The sensors may be of any convenient type, such as a toothed rotor attached to the rotating wheel and stationary magnetic pickup means sensing the passage of each tooth in the rotor as the rotor rotates with the wheel.

The output signals from the wheel sensors are communicated to a logic control 14 which generates control signals when a skid condition during braking is determined. The control logic 14 may be activated when the operator actuates the brake control, illustrated as a foot pedal 16 which actuates a signal generating device, such as switch 18, communicating an electrical signal to the control logic 14 indicative of an operator command for deceleration. Alternatively, the control logic 14 may be energized by an electrical switch actuated by the pressure in the hydraulic brake lines when braking pressure is applied. The control logic may be a relatively simple system in which logic detects the exclusive stopping of one or more wheels while the others continue to rotate, and generates corrective signals for the wheel or wheels that have stopped rotating. Alternatively, the control logic many respond to the deceleration rate of each wheel and generate a corrective signal to the wheel decelerating faster than a predetermined maximum deceleration rate. The control logic many alternatively be a comparator comparing the rotational speed or deceleration rate of the remaining wheels and generating corrective signals indicative of which wheel or wheels are in or approaching a skid condition. The various types of logic control devices are well known in the art and need not be explained in detail. The type of control logic incorporated into the system is relatively immaterial to the invention. However, a control logic 14 in one form or another is necessary to generate control signals which can be applied to the wheel in or approaching a skid condition.

The signals generated by the control logic 14 are applied to a set of control valves 20 controlling the flow of fluid from a pressurized fluid source 22 to the energy absorbing interface between the rotating and nonrotating elements of the brake system. The introduction of the fluid between the rotating and nonrotating elements of the brake system operates directly on the friction between these elements and reduces the power absorption capability of the particular brake. The fluid may be either a gas or a liquid. Whether the fluid is a gas or liquid it must not harm the brake materials and must remove itself sufficiently fast from the interface to allow brake reapplication shortly after the injection of the fluid has been terminated. The pressurized fluid source 22 may be a static fluid supply such as a high pressure cylinder, or may be a dynamic system including a compressor and an accumulator. A dynamic system is particularly applicable when the injected fluid is air. The compressor may be driven directly from the vehicle's engine, may be driven by a separate engine, an electric motor, or may derive its power from the rotation of one or more wheels.

The operation of the system is as follows. When the vehicle's operator actuates the vehicle's hydraulic braking system, such as by depressing brake pedal 16, the control logic 14 is energized by switch 18. The control logic 14 then responds to the signals generated by the individual wheel sensors 12 and generates a signal communicated to the control valves 20 of each wheel sensed as in or approaching a skid condition. The control valve 20 opens in response to the signal from the control logic 14 and fluid from the pressurized fluid source 22 is injected between the power absorbing surfaces of the associated brake. The injected fluid reduces the friction between the braking surfaces terminating the imminent skid condition of the associated wheel. The control logic 14 senses the termination of the imminent skid condition of the wheel and terminates the signal actuating the valve 20. Upon termination of the signal, the valve 20 closes, terminating the fluid injection, and full braking power is restored to the wheel. Deactivation of the pressurized hydraulic or pneumatic braking system by releasing pedal 16 deactivates both the pressurized brake system and the antiskid system.

Figure 2:
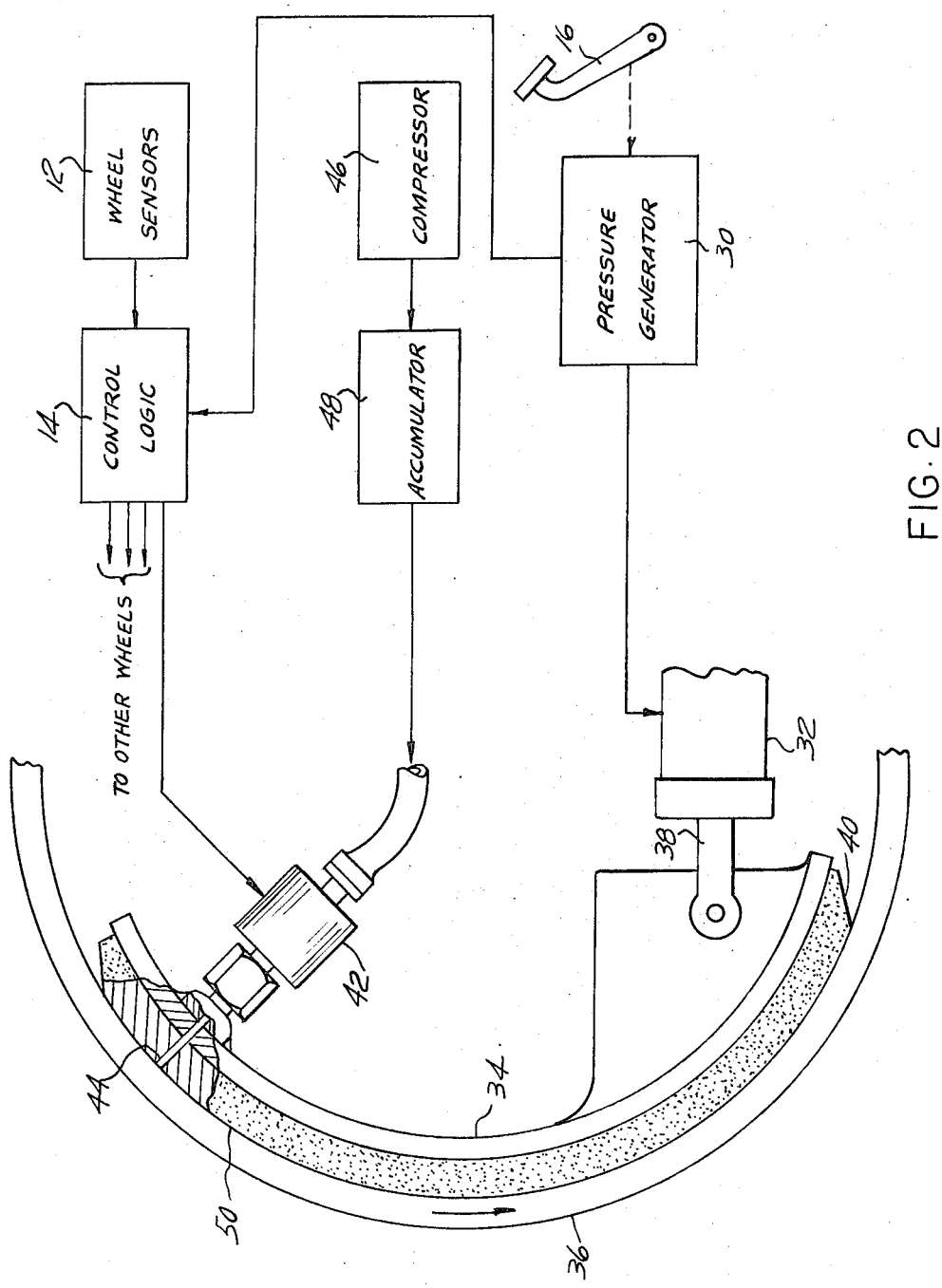
FIG. 2 is a detailed illustration of the antiskid system applied to one brake shoe in a drum type braking system.

FIG. 2 is an illustration of the antiskid system applied to a drum braking system. The vehicle's pressurized brake system is activated by a control element, again illustrated as a foot pedal 16, which the operator depresses when he desires to stop the vehicle. The mechanical force applied to the foot pedal is communicated to a brake pressure generator 30 which may be a direct mechanical-to-pressure converter or may be anyone of the several power assisted systems well known in the art. The pressure generator 30 in response to actuation of the foot pedal 16 increases the pressure in a brake cylinder 32 urging an internal piston (not shown) to move outwardly displacing a brake shoe 34 toward the brake drum 36 by means of a mechanical link 38. The drun 36 is fixedly attached to the wheel and rotates therewith while the shoe 34 is pivotably attached to a stationary element of the wheel assembly, such as the axle housing, and has a stationary relationship to the rotating wheel. Displacement of the shoe 34 causes a brake paid (or lining) 40 fixedly attached to the shoe 34 to frictionally engage the rotating drum 36. The friction caused by the engagement of the pad with the drum absorbs the energy of the rotating wheel causing the rotational speed of the wheel, and therefore the vehicle, to slow down. The rate at which the energy is absorbed is a function of the friction between the brake pad and the drum which in turn is a function of the force with which the pad is pressed against the drum by the piston in the hydraulic cylinder 32. While the hydraulic braking system is described with reference to a single brake shoe and pad in the wheel assembly, it is recognized that each wheel may contain more than one brake shoe and associated pad actuated by one or more brake cylinders using a variety of methods and techniques well known in the art.

The function of any antiskid system is to control the friction between the brake pad 40 and drum 36 so that the energy absorbed by the brake causes the rotational velocity of all the wheels to decelerate at approximately the same rate and at a rate not exceeding a maximum permissible rate of deceleration. In prior art systems, this is accomplished by monitoring the rotational speed of each wheel with a sensor and controlling the pressure applied between the pad and the drum by controlling the pressure applied to the means of brake cylinder 32 to cause each wheel to decelerate at the desired rate. The disclosed antiskid system uses a completely different principle and controls the friction between the brake pad and the drum by operating directly on the friction between these two surfaces without readjusting the pressure applied to the brake cylinder as will be explained hereinbelow.

The control logic 14 responds to the signals generated by the wheel sensors 12 indicative of the rotational speed of each wheel, senses an imminent skid condition by any of the several techniques known in the art, and generates an electrical signal communicated to a control valve, illustrated as a solenoid valve 42 associated with the wheel in or in danger of skidding. The valve 40 controls the flow of a pressurized fluid, which may be either a gas or a liquid through a passageway 44 formed through the brake shoe 34 and brake pad 40 to the interface 50 between the brake pad 40 and the brake drum 36. The pressurized fluid is derived from pressurized fluid source which may be static pressurized fluid supply, or may comprise a compressor 46 and accumulator 48 as illustrated in FIG. 2. The pressure of the fluid in the pressurized source must exceed the maximum pressure that can be applied to the brake shoe by the pressurized braking system by a predeterminable pressure dependent upon the mechanical configuration of the brake system.

Actuation of the valve 42 in response to a signal from the control logic 14 injects the pressurized fluid between the drum and the pad. The fluid circulates across the entire face of the pad due to wear grooves and the rotation of the drum 36. This circulation combined with the dynamic wedge effect commonly observed in journal bearings will cause the pad to rise slightly against the force generated by the piston in brake cylinder 32 reducing the contact area between these two elements. The pads will ride on the fluid film which forms an almost frictionless fluid bearing as long as fluid is being interjected into the interface. This action is similar to the fluid bearings used to support data recording sensing heads in tape and disc recorders or air cushions utilized in ground effects machines.

The fluid injected between the pad and the drum may be a gas or a liquid. However, if a liquid is used it is preferable that the liquid be nonflamable and have a high rate of evaporation so that it is capable of being quickly dissipated from the interface upon termination of the injection. The fluid should also be relatively inert so that it will not contaiminate or deteriorate the brake drum or brake pad so as to permanently affect the coefficient of friction between the two frictionally engaging surfaces.

Because of finite time period is associated with the dissipation of the fluid from the interface 50, the signals generated by the control logic 14 may be a series of repetitive pulses having a pulse interval approximately equal to or slightly less than the fluid dissipation time. There is a threefold advantage to pulsing the injection signal. First, the reduction of friction between the frictionally engaged surfaces during the injection period and the dissipation time may be sufficient to alleviate the imminent skid condition. Therefore, termination of the injection prior to sensing the termination of the skidding condition will permit restoration of the full braking force at an earlier point in time. Secondly, pulsing the fluid injection will prevent the surfaces from becoming saturated with the fluid during prolonged application thereby significantly reducing the dissipation time. And lastly, will reduce the amount of fluid consumed by the antiskid system with an accompanying reduction in the size and capacity for the pressurized fluid source.

Figure 5:
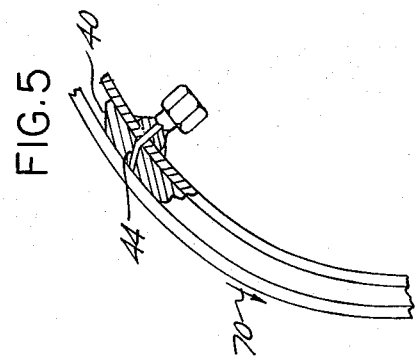
FIG. 5 illustrates the alternate configuration having the fluid passage angularly disposed to the radius of the brake shoe.
Figure 4:
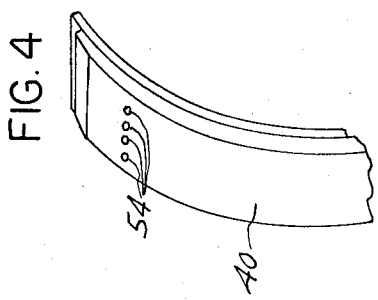
FIG. 4 illustrates the fluid passage as a series of holes in the brake shoe and pad.
Figure 3:
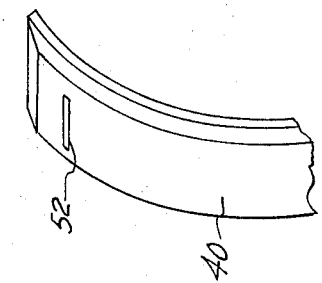
FIG. 3 illustrates the fluid passage as a narrow slot aperture in the brake shoe and pad.

FIGS. 3 and 4 illustrate two possible configurations of the fluid passage through the brake pad 40. In FIG. 3, the passage 44 is illustrated as a narrow slit 52. Alternatively, as illustrated in FIG. 4, the passage 44 may be a series of small holes 54. The holes 54 may be disposed along a straight line or staggered to increase the mechanical strength of the pad 40 in the immediate area surrounding the fluid passage. Although the fluid passage is shown as radially disposed through the pad, the passage may be angularly disposed with regard to the radius, so that the fluid is injected into the interface region wih a velocity component in the direction of the rotating surface of the drum indicated by the arrow 70 in FIG. 5. While several preferred configurations of the fluid passage through the brake pad 38 are illustrated, the invention is not limited to the configurations show and may be of any alternate configuration determined by good engineering and fabrication practices.

Figure 6:
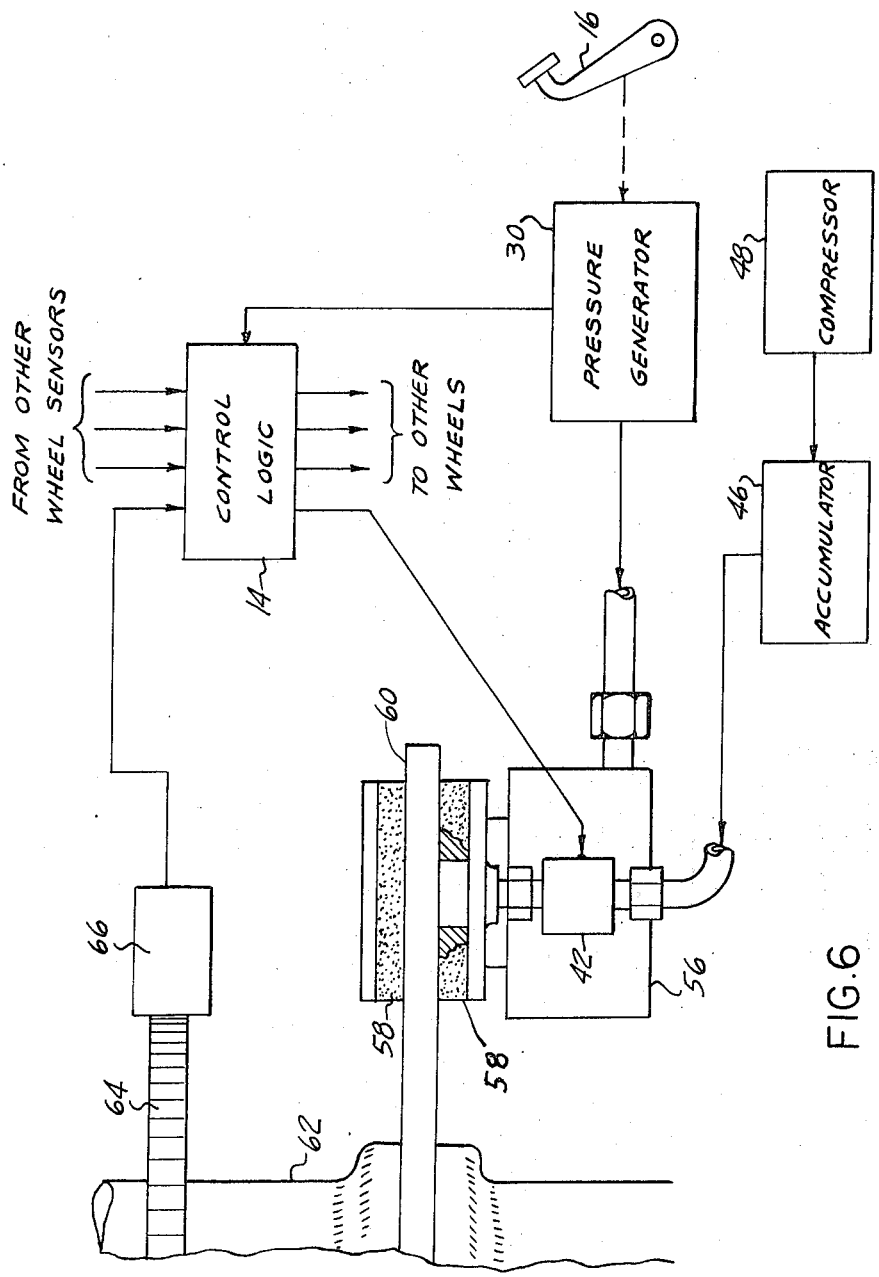
FIG. 6 is a detailed illustration of the antiskid system applied to one brake pad on a disc type brake system.

FIG. 6 illustrates the inventive antiskid system applied to a typical disc brake system. As in FIG. 2, the vehicle's brake system pressure generator 30 is actuated when the operator depresses a brake pedal 16. The pressure generator 30 as before may be a simple converter of a mechanical force to a fluid pressure or may be in the form of a power assisted system. The fluid pressure generated in the generator 30 is communicated to an actuator 56 which responds to an increase in pressure and urges a brake pad or puck 58 against a disc 60 fixedly attached to a rotating element of the wheel, illustrated as axle 62. To simplify the description of the basic elements of a disc brake system, actuator 56 is illustrated as actuating only one of the two opposing pucks 58 pressing against the disc 60. Operative disc brake systems, however, may employ mechanisms which cause both pucks 58 to press against the disc with equal and opposite forces. The friction between the rotating disc and the stationary mounted pucks dissipates the rotational energy of the wheel.

The wheel speed sensor described with reference to block 12 of FIG. 1 is illustrated as a toothed wheel 64 fixedly attached to the axle 62 and a magnetic pickup 66. The signal generated as the teeth of wheel 64 rotate passed the pickup 66 is input to the control logic 14 along with signals from like sensors monitoring the speed of other wheels on the vehicle. The control logic 14 may be of any type as previously discussed with reference to FIG. 2 which generates signals applicable to the individual wheels when an imminent skid condition is sensed. The signals from the control logic 14 are applied to control valves associated with each wheel controlled by the antiskid system. When the output of the control logic 14 is an electrical signal, the signal is applied to an electromechanical valve, illustrated in FIG. 6 as a solenoid valve 42. The valve 42 opens in response to the signal and permits pressurized fluid from a pressurized fluid source to be injected between the interface between the puck 58 and the disc 60 through a passageway 44 in the puck. The pressurized fluid source may be a pressure cylinder, or may be comprised of a compressor 46 and an accumulator 48 as illustrated. The operation of the injected fluid to reduce the friction between the puck and the disc is the same as described with relation to the drum brake system illustrated in FIG. 2.

Although the hydrostatic antiskid system is described and illustrated with relation to simplified pressurized braking systems, the concept disclosed and claimed in the appended claims are directly applicable to the more sophisticated brake systems known in the art. As stated above, the injected fluid may be either a liquid or a gas including pressurized air which may be derived from any number of possible sources. The advent of exhaust reactors for pollution control which require air pressurizing systems for injecting additional air into the reactors may provide an existing source of pressurized air for the disclosed antiskid system.

A further advantage of the disclosed system is that the injected fluid will also cool the interface adding to the life and efficiency of the braking system.

What is claimed is:

1. An antiskid brake system for a vehicle which receives operator commands and provides a fluid pressure braking signal indicative thereof and at least one fluid operated brake for a road engaging wheel of said vehicle, wherein said brake absorbs the kinetic energy of said vehicle by the frictional engagement of a surface on a rotational member associated with said road engaging wheel and a surface on a nonrotating member comprising:
   means for sensing skidding between said wheel and said road;
   means responsive to said sensing means for injecting a fluid between the frictionally engaging surface on said rotating member and the frictionally engaging surfaces on said nonrotating member to decrease said frictional engagement.

2. The antiskid brake system of claim 1 wherein said skid sensing means comprises:
   means for sensing the rotational speed of said road engaging wheel; and
   control logic responsive to said wheel speed sensing means for generating a signal indicative that said wheel is skidding.

3. The antiskid system of claim 2 wherein said control logic generated signal is a series of pulses having a predeterminable interpulse interval.

4. The antiskid system of claim 2 wherein said fluid injecting means comprises:
   a source of pressurized fluid,
   a valve responsive to the signal generated by said control logic for controlling the fluid flow from said pressurized source, said valve having an input connected to said pressurized source and an output; and
   means for directing the fluid flow from the output of said valve to between the frictionally engaged surfaces of said rotating member and said stationary element.

5. The antiskid system of claim 4 wherein said source of pressurized fluid is a cource of pressurized liquid.

6. The antiskid system of claim 4 wherein said source of pressurized fluid is a source of pressurized gas.

7. The antiskid system of claim 6 wherein said source of pressurized gas is a source of pressurized air.

8. The antiskid system of claim 7 wherein said source of pressurized air comprises:
   a compressor for compressing air; and
   an accumulator for storing said compressed air in said compressed state.

9. The antiskid system of claim 4 wherein said nonrotating member has a fluid passageway therethrough, one end of said passageway exiting said nonrotating member along said frictionally engaging surface and the other end of said passage exiting on an alternate surface, said means for directing comprises said fluid passageway and means for connecting the output of said valve to the end of the passageway exiting on said alternate surface.

10. The antiskid system of claim 9 wherein said brake further includes a brake pad fixedly attached to said nonrotating member for frictionally engaging said rotating member, said means for directing further includes a passageway through said brake pad connecting to the passageway through said nonrotating member.

11. An antiskid brake system for vehicle which receives operator commands and provides a fluid pressure braking signal indicative thereof and at least one fluid operated brake for a road engaging wheel of said vehicle, wherein said brake absorbs the inertial energy of said vehicle by the frictional engagement of a surface on a rotating member associated with said road engaging wheel and a surface on a nonrotating member comprising:
   means for sensing skidding between said wheel and said road;
   a source of pressurized fluid;
   means for conducting a flow of said pressurized fluid from said pressurized source to between the frictionally engaging surfaces of said rotating member and said nonrotating member; and
   means interposed along said means for conducting between said pressurized source and said frictionally engaging surfaces for controlling the flow of said pressurized fluid in response to said sensing means.

12. The antiskid system of claim 11 wherein said vehicle has more than one fluid operated brake, said system further includes:
   means for sensing the skidding of each wheel having a fluid operated brake and for generating a signal indicative of each wheel sensed as skidding;
   means for conducting said fluid flow to each of said wheels having a fluid operated brake; and
   means interposed along each of said conducting means for controlling the flow of pressurized fluid to each wheel having a fluid operated brake in response to signals generated by said sensing means indicative that the particular wheel is skidding.

13. The antiskid system of claim 12 wherein said means for sensing skidding includes:
   means for measuring the rotational speed of each wheel having a fluid operated brake; and
   logic control responsive to the sensing means for generating signals indicative of the wheels that are skidding.

14. The antiskid system of claim 13 wherein said control logic generated signal is a series of pulses having a predetermined interpulse interval.

15. The antiskid system of claim 13 wherein said logic control generates signals indicative of skidding when at least one wheel has stopped rotating and at least one wheel is still rotating.

16. The antiskid system of claim 13 wherein said logic control generates signals indicative of skidding when at least one wheel is decelerating at a rate above a predetermined rate of deceleration which is related to the maximum deceleration rate of said wheel.

17. The antiskid system of claim 13 wherein said logic control generates signals indicative of skidding when the deceleration rate of at least one wheel is greater than the deceleration rate of the other wheels.

18. The antiskid system of claim 12 wherein said source of pressurized fluid is a source of pressurized liquid.

19. The antiskid system of claim 12 wherein said source of pressurized fluid is a source of pressurized gas.

20. The antiskid system of claim 19 wherein said source of pressurized gas is a source of pressurized air.

21. The antiskid system of claim 20 wherein said source of pressurized air comprises:
an air compressor; and
an accumulator for storing said compressed air.

22. The antiskid system of claim 21 wherein said air compressor further includes an independent source of power driving said compressor.

23. The antiskid system of claim 22 wherein said vehicle is powered by an engine, said independent source of power is said engine.

24. The antiskid system of claim 12 wherein said nonrotating member has a fluid passageway therethrough, one end of said passageway exiting said nonrotating member along said frictionally engaging surface and the other end of said passageway exiting on an alternate surface, said means for conducting comprises means for conducting fluid to the end of said passageway exiting on said alternate surface, and said passageway.

25. The antiskid system of claim 24 wherein said brake further includes a brake pad fixedly attached to said nonrotating member for frictionally engaging said rotating member, said passageway passes through said nonrotating member and said brake pad to said friction engaging surface.

26. The antiskid system of claim 24 wherein said passageway is a narrow slit.

27. The antiskid system of claim 25 wherein said passageway is a plurality of holes formed in said nonrotating member.

28. An antiskid system for a vehicle having ground engaging wheels comprising:
means responsive to an operator's command and applied to at least one of said ground engaging wheels for absorbing the kinetic energy of said vehicle by the frictional engagement of a surface on a rotating member associated with said ground engaging wheel, and a surface on a nonrotating member associated with said vehicle;
means for sensing the rotation of said at least one wheel;
means responsive to said sensing means for determining skidding between said wheel and said ground; and
means responsive to said determining means for injecting a fluid between the frictionally engaged surfaces of said energy absorbing means.

29. The antiskid system of claim 28 wherein said means for injecting comprise:
a source of pressurized fluid;
means for conducting a flow of said pressurized fluid from said source to at least one of said frictionally engaged surfaces; and
means interposed along said conducting means between said source and said at least one frictionally engaged surface for controlling the fluid flow to said at least one frictionally engaged surface.

30. The antiskid system of claim 29 wherein said skid determining means generates a repetitive pulse signal when skidding is determined, said pulse signal having an inter-pulse interval approximately equal to the dissipation time of the fluid from between the frictionally engaged surfaces.

* * * * *